United States Patent [19]
Shima et al.

[11] Patent Number: 5,949,934
[45] Date of Patent: Sep. 7, 1999

[54] OPTICAL WAVEGUIDE GRATING AND PRODUCTION METHOD THEREFOR

[75] Inventors: Kensuke Shima; Michihiro Nakai, both of Sakura; Hiroshi Hidaka, Yotsukaido; Kuniharu Himeno, Sakura; Satoshi Okude, Sakura; Akira Wada, Sakura; Masaaki Sudoh, Sakura; Tetsuya Sakai, Sakura; Takuya Ienaka, Sakura; Ryozo Yamauchi, Sakura, all of Japan

[73] Assignee: Fujikura, Ltd., Tokyo, Japan

[21] Appl. No.: 08/823,629

[22] Filed: Mar. 26, 1997

[30] Foreign Application Priority Data

| Apr. 5, 1996 | [JP] | Japan | 8-084113 |
| May 31, 1996 | [JP] | Japan | 8-139260 |
| Jun. 6, 1996 | [JP] | Japan | 8-144639 |

[51] Int. Cl.$^6$ ........................... G02B 6/34
[52] U.S. Cl. ................. 385/37; 385/128; 385/132
[58] Field of Search .............. 385/37, 129, 130, 385/29, 126–128, 131–132; 372/96

[56] References Cited

U.S. PATENT DOCUMENTS

| 4,637,686 | 1/1987 | Iwamoto et al. | 385/128 |
| 5,059,475 | 10/1991 | Sun et al. | 428/195 |
| 5,295,209 | 3/1994 | Huber | 385/37 |
| 5,367,589 | 11/1994 | MacDonald et al. | 385/37 |
| 5,430,817 | 7/1995 | Vengsarkar . | |
| 5,517,589 | 5/1996 | Takeuchi | 385/24 |
| 5,641,956 | 6/1997 | Vengsarkar et al. | 385/28 |
| 5,677,920 | 10/1997 | Waarts et al. | 372/6 |

FOREIGN PATENT DOCUMENTS

| 0141038 | 5/1985 | European Pat. Off. . |
| 0300471 | 1/1989 | European Pat. Off. . |
| 0569182 | 11/1993 | European Pat. Off. . |
| 0607990 | 7/1994 | European Pat. Off. . |
| 2246234 | 1/1992 | United Kingdom . |
| 9400784 | 1/1994 | WIPO . |

OTHER PUBLICATIONS

Long–Period Fiber Gratings as Band–Rejection Filters, *Journal of Lightwave Technology*, vol. 14, No. 1, Jan., 1996.
Temperature–insensitive long–period fiber gratings, Proc. OFC'96, PDI (1996) No month.
Handbook of Glass Properties, *Academic Press, Inc.*, 1986 No month.
D. L. Williams et al, "Enhanced UV . . . ", vol. 29, No. 1, Jan. 7, 1993, pp. 45–47.
D. L. Williams et al, "Broad Bandwidth . . . ", Sep. 27, 1992, pp. 923–926.
AM Vengsarkar et al, "Long–Period Fiber . . . ", vol. 14, No. 1, Jan. 1, 1996, pp. 58–65.
Raman Kashyap, "Photosensitive Optical Fibers . . . ", vol. 1, No. 1, Oct. 1, 1994, pp. 17–34.
M. Wilkinson et al, "D–Fibre Filter For . . . ", vol. 28, No. 2, Jan. 16, 1992, pp. 131–132.
Electronic Letters, vol. 29, No. 1, Jan. 7, 1993, pp. 45–47 "Enhanced UV Photosensitivity In Boron Codoped Germanosilicate Fibres".
"Broad Bandwidth Highly Reflecting Gratings Formed in Photosensitive Boron Codoped Fibres" Sep. 27, 1992, pp. 923–926.
Handbook of Glass Data, *Elsevier Science Publishers*, 1985 no month.
Photosensitivity of solgel–derived germanosilicate planar waveguides, *Optics Letter*, vol. 18, No. 1, pp. 25–27, 1993 Jan..
Laser–Trimmed Four–Port Bandpass Filter Fabricated in Single–Mode Photosensitive Ge–Doped Planar Waveguide, *IEEE Photonics Technology Letters*, vol. 5, No. 2, Feb. 1993.

*Primary Examiner*—Rodney Bovernick
*Assistant Examiner*—Ellen E. Kang
*Attorney, Agent, or Firm*—Sprung Kramer Schaefer & Briscoe

[57] ABSTRACT

An optical waveguide grating with radiative mode-coupling properties, with exceptional stability and reliability as an optical component, wherein the central wavelength of the rejection band has a low temperature dependence, due to the use of silica glass doped with germanium and boron for the core. The rejection bandwidth can be narrowed without increasing the grating length by forming the radiative mode-coupled optical waveguide grating in an optical waveguide wherein the mean relative refractive index difference of the core is greater than that of optical communication waveguides. The rejection can be increased by reducing the occurrence of cases wherein propagation modes of the core coupled to cladding modes once again couple to the core in palnar optical waveguide gratings formed by making periodic changes in the waveguide structure along the direction of propagation of light in an optical waveguide having a cladding with a lower refractive index than the core surrounding the core, by making the thickness of the cladding at least thirteen times the thickness of the core.

8 Claims, 9 Drawing Sheets

OPTICAL WAVEGUIDE GRATING AND PRODUCTION METHOD THEREFOR

BACKGROUND OF THE INVENTION

1. Field of the Invention

The present invention relates to optical waveguide gratings, particularly to radiative mode-coupled optical waveguide gratings.

2. Description of the Related Art

Optical waveguide gratings are optical fibers or planar optical waveguides having constant periodic changes in the longitudinal direction, such as periodic changes in the refractive index of the core or periodic changes in the core diameter.

In general, gratings can be divided into radiative mode-coupled types and reflective mode-coupled types. Radiative mode-coupled gratings are capable of attenuating light of specific wavelengths due to radiation from the optical waveguide by coupling modes propagating in the core with modes propagating in the cladding. Reflective mode-coupled gratings reflect light of specific wavelengths by coupling modes propagating through the core in a positive direction and modes propagating through the core in the opposite direction (negative direction).

Mode-coupling is made possible by perturbations which occur in the core. Generally, when gratings are formed in optical fibers, these perturbations are often achieved by means of periodic changes in the core refractive index.

The main structural difference between radiative mode-coupled gratings and reflective mode-coupled gratings is in the periods of the periodic changes (hereinafter referred to as the grating pitch). For example, in the case of optical fiber gratings formed by making periodic changes in the core refractive index of optical fibers, radiative gratings are obtained by making the grating pitch approximately several hundred microns, and reflective gratings are obtained by making the grating pitch approximately 1 micron.

Radiative mode-coupled gratings have wavelength-transmission loss properties (transmission spectra) as shown in FIG. 7, wherein the transmission loss of light in a specific wavelength band is selectively increased. The width of the wavelength band with an increased transmission loss is referred to as the rejection bandwidth, the central wavelength thereof is referred to as the central wavelength of the rejection band, and the magnitude of the change in transmission loss is referred to as the rejection.

As a conventional method for producing optical waveguide gratings, there is a method for making periodic refractive index changes in the core by taking advantage of the properties of silica glass doped with germanium, of which the refractive index will increase when exposed to strong UV radiation, depending on the amount of exposure.

For example, when producing a radiative mode-coupled optical fiber grating, either an optical fiber with a germanium-doped core and a silica cladding, or an optical fiber with a germanium-doped core and a fluorine-doped cladding is used. This optical fiber is hydrogenated in a hydrogen-pressurized container (approximately 100 atm), and then either exposed to UV radiation at constant periods along the longitudinal direction of the optical fiber using a photomask, or exposed to UV radiation at regularly spaced intervals along the longitudinal direction of the optical fiber.

However, conventional radiative mode-coupled optical fiber gratings made from optical fibers with germanium-doped cores and silica claddings or optical fibers with germanium-doped cores and fluorine-doped claddings have the undesirable property that the central wavelength of the rejection band has a high temperature dependence.

Specifically, this type of optical fiber grating has a temperature characteristic of approximately 0.05 nm/°C., meaning that as the temperature rises (or drops) by 10° C., the central wavelength of the rejection band will shift to longer wavelengths (or shorter wavelengths) by approximately 0.5 nm. Therefore, they are not dependable in terms of their stability and reliability as optical components.

On the other hand, the grating properties of optical waveguide gratings are known to change with the parameters of the gratings, i.e. the amount of change in the core refractive index, the grating pitch, the grating shape (profile of the core refractive index), the grating length in the longitudinal direction of the optical fiber, and the effective refractive index.

The following Table 1 summarizes the influence that each parameter of a grating has on the grating properties. In the table, x indicates no influence, O indicates some influence, and Δ indicates a small influence. Additionally, the arrows ○ ( ) indicate whether the value of the grating property will increase decrease) in response to an increase in the parameter value.

TABLE 1

| PARAMETER | Central Wavelength | Rejection | Rejection Bandwidth |
|---|---|---|---|
| Change in Refractive Index | ○↑ | ○↑ | x |
| Grating Pitch | ○↑ | Δ | x |
| Grating Shape | ○ | ○ | x |
| Grating Length | x | ○↑ | ○↓ |
| Effective Refractive Index | ○↑ | x | x |

Radiative mode-coupled optical fiber gratings can be used in the field of optical communications, and are especially suitable for use in order to reduce the wavelength dependence of the gain in erbium-doped optical fiber amplifiers in optical communication systems which perform wavelength-division-multiplexed transmissions. In this case, the radiative mode-coupled optical fiber grating should preferably be designed so that the rejection band is the same as the wavelength region used for transmission.

For example, FIG. 8 shows the wavelength dependence of the gain of a erbium-doped optical fiber amplifier, and this optical fiber amplifier can be used in an optical communication system for performing wavelength-division multiplexed transmissions between wavelength A and wavelength B.

The optical fiber grating used in this optical communication system should be designed such as to have a rejection band which overlaps the wavelength region between wavelength A and wavelength B, and such that the wavelength-transmission loss properties in this wavelength region form a curve similar to the wavelength dependence of the gain in the same wavelength region (the curve in the graph). This type of design efficiently equalizes the gain in this wavelength region.

Conventionally, the only known method for controlling the rejection band width of a radiative mode-coupled grating is to adjust the grating length as indicated in Table 1 above.

However, the wavelength region used in wavelength-division multiplexed transmission is usually determined by the gain band of the erbium-doped optical fiber amplifier, and this is the wavelength region between wavelength A and wavelength B in FIG. 8. While the bandwidth is approximately 15–20 nm, if a radiative mode-coupled grating having a relatively narrow rejection bandwidth corresponding thereto is to be made, the grating length becomes extremely long.

For example, optical fibers identical to the optical fibers used for communications are conventionally used to make optical fiber gratings, but in order to make the rejection bandwidth less than 15 nm with this type of optical fiber, the grating length must be at least 50 mm.

If the grating length of an optical fiber grating is too long, it becomes insuitable for compact optical components, and is not capable of being contained in existing repeaters.

Additionally, while optical fiber gratings are normally used with both sides of the cladding portion affixed to a substrate or the like by means of an adhesive, the resonance frequency of the grating portion is reduced if the grating length is increased, so that there is a risk of the grating portion resonating during vibration testing or during the installation of repeaters.

Palnar optical waveguides can similarly be formed into radiative mode-coupled gratings or reflective mode-coupled gratings by means of perturbations in the core.

These perturbations can be achieved relatively easily by means of periodic changes in the core diameter (core width) of the waveguide in the case of radiative mode-coupled gratings, and can be achieved by means of changes in the core refractive index of the waveguide in the case of reflective mode-coupled gratings due to the shortness of the grating pitch.

However, radiative mode-coupled gratings formed in palnar optical waveguides have a problem in that their rejections cannot be made sufficiently large in comparison to radiative mode-coupled gratings in optical fibers.

That is, while the rejection changes periodically if the grating length is increased in a radiative mode-coupled grating, in the case of an optical fiber grating, the period of the changes in the rejection is comparatively long and the amount of change is large, so that the rejection can be monotonically increased if the grating length in increased within the normally used range.

In contrast, in radiative mode-coupled palnar optical waveguide gratings, the period for the rejection change is comparatively short and the amount of change is small, so that the rejection cannot be made greater than a certain value because the rejection will simply change periodically even if the grating length is increased.

SUMMARY OF THE INVENTION

The present invention has the object of resolving the following problems in radiative mode-coupled optical waveguide gratings.

The first problem is to obtain a radiative mode-coupled optical waveguide grating with exceptional temperature characteristics, wherein the central wavelength of the rejection band has a low temperature dependence.

The second problem is to make the rejection bandwidth narrower without increasing the grating length in an optical waveguide grating.

The third problem is to make the rejection sufficiently large in a radiative mode-coupled optical waveguide grating.

In the present invention, the above-mentioned problems are solved as follows.

A first aspect of the present invention offers an optical waveguide grating using an optical waveguide composed of silica glass material, comprising a core which is doped with germanium and boron.

A second aspect of the present invention offers an optical waveguide grating comprising a radiative mode-coupled grating formed in an optical waveguide having a core with a mean relative refractive index greater than that of optical waveguides used for communication purposes.

The above-mentioned optical waveguide grating according to the second aspect of the present invention can be obtained by a method for producing an optical waveguide grating, comprising steps of determining the relationship between the grating length, the mean relative refractive index difference of the core, and the rejection bandwidth of the grating for an optical waveguide grating; determining, based on this relationship, a mean relative refractive index difference of the core which simultaneously satisfies the desired grating length and rejection bandwidth conditions; and forming a radiative mode-coupled grating in an optical waveguide having a core with this mean relative refractive index difference.

A third aspect of the present invention offers a palnar optical waveguide grating having periodic changes in the waveguide structure along the longitudinal direction of an optical waveguide, comprising a core; and a cladding surrounding the core, with a lower refractive index than the core; wherein the cladding has a thickness which is at least thirteen times the thickness of the core.

According to the first aspect of the present invention, the following effects can be obtained.

That is, the radiative mode-coupled optical waveguide grating according to the first aspect of the present invention reduces the temperature dependence of the central wavelength of the rejection band due to the use of silica glass having a core doped with germanium and boron. Consequently, it is possible to obtain a radiative mode-coupled optical waveguide grating having excellent temperature characteristics which is stable and reliable as an optical component.

Furthermore, this radiative mode-coupled optical waveguide grating is capable of improving the temperature characteristics of optical waveguide gratings simply by doping with boron in addition to germanium, allowing conventional grating production methods to be applied without modifications, thereby making production simple and offering an economic advantage by not requiring the installation of new equipment.

The germanium and boron should preferably be added in the forms of $GeO_2$ and $B_2O_3$ respectively, and the concentration of $B_2O_3$ in the core should preferably be less than or equal to 2.0 times the concentration of $GeO_2$ in the core. As a result, it is possible to obtain a radiative mode-coupled optical waveguide grating with excellent temperature characteristics such that the temperature dependence of the central wavelength of the rejection band is small, as well as making it possible to achieve a radiative mode-coupled grating having the inverse properties as conventional gratings having cores doped only with germanium.

Additionally, radiative mode-coupled optical fiber gratings which use optical fibers as the optical waveguides have good connections to optical components and the like which use other optical fibers, thus allowing for effective use in the optical communication field using optical fibers, and making it possible to improve the temperature characteristics, stability and reliability of optical communication systems.

According to the second aspect of the present invention, the following effects can be obtained.

That is, the optical waveguide grating according to the second aspect of the present invention is an optical waveguide grating comprising a radiative mode-coupled grating formed in an optical waveguide having a core with a mean relative refractive index greater than that of optical waveguides used for communication purposes.

Consequently, the rejection bandwidth can be narrowed without increasing the grating length.

Additionally, if an optical waveguide having single-mode transmission properties in the operative wavelength region of the grating is used, then the connection loss with single-mode optical waveguides used in existing optical communication systems can be small and it is not necessary to consider the existence of transmission loss peaks occurring at higher order modes.

Additionally, this optical waveguide grating can be produced by determining the relationship between the grating length, the mean relative refractive index difference of the core, and the rejection bandwidth of the grating for an optical waveguide grating; then determining, based on this relationship, a mean relative refractive index difference of the core which simultaneously satisfies the desired grating length and rejection bandwidth conditions; and forming a radiative mode-coupled grating in an optical waveguide having a core with this mean relative refractive index difference.

As a result, an optical waveguide grating having the desired grating length and rejection bandwidth can be easily and reliably obtained.

According to a third aspect of the present invention, the following effects can be obtained.

That is, the optical waveguide grating according to the third aspect of the present invention is a palnar optical waveguide grating having periodic changes in the waveguide structure along the longitudinal direction of an optical waveguide, comprising a core; and a cladding surrounding the core, with a lower refractive index than the core; wherein the cladding has a thickness which is at least thirteen times the thickness of the core.

Consequently, the thickness of the cladding is sufficiently large with respect to that of the core, so that the recoupling to core propagation modes which have been coupled from cladding modes back to the core can be reduced, so as to allow increases in the rejection.

Additionally, the same effects can be obtained by means of a palnar optical waveguide grating wherein the substrate has a refractive index equal to that of the cladding layer, since these allow the cladding layer to be sufficiently thick with respect to the core. Moreover, since the rejection can be increased simply by making the substrate out of a material having a refractive index equal to that of the cladding layer, it is easily achieved without any large modifications to the process for producing the palnar optical waveguide, and is advantageous in terms of costs because there is no need for additional funds to install new production equipment.

Additionally, a palnar optical waveguide grating provided with a cladding mode absorption layer having a higher refractive index than the cladding on the outside of the cladding in the thickness direction can make cladding modes couple to the cladding mode absorption layer so as to efficiently absorb and attenuate them, thereby reducing their recoupling from the cladding mode to the core propagation mode, and increasing the rejection.

Furthermore, the wavelengths of the cladding modes absorbed and attenuated by the cladding mode absorption layer can be changed by changing the thickness of the cladding mode absorption layer, so that it is possible to further increase the wavelength selectivity for the light attenuated by the palnar optical waveguide grating.

These types of effects can also be obtained by means of an optical fiber grating, by forming an optical fiber grating comprising a cladding mode absorption layer with a higher refractive index than the cladding around the circumference of the cladding.

PREFERRED EMBODIMENTS OF THE INVENTION

Hereinbelow, a first embodiment for resolving the first problem, a second embodiment for resolving the second problem, and a third embodiment for resolving the third problem of the present invention will be explained in detail.

First Embodiment

Figure 1:
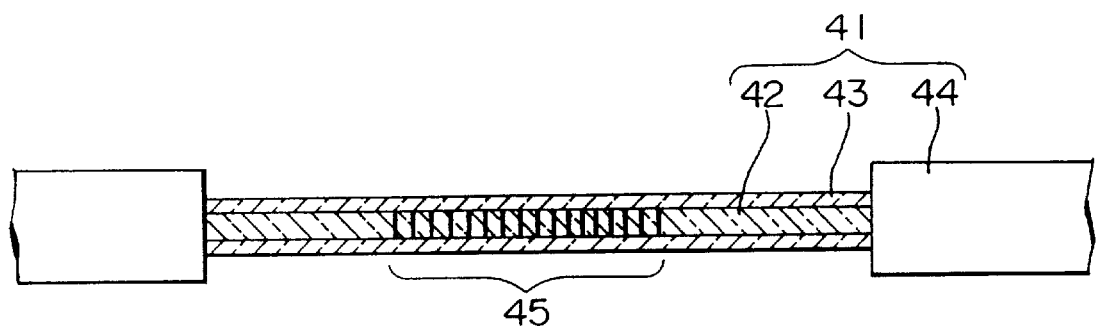
FIG. 1 is a partial section view showing an example of a radiative mode-coupled optical waveguide grating according to a first embodiment of the present invention.

FIG. 1 is a partial section view illustrating an example of a radiative mode-coupled optical fiber grating (hereinafter sometimes referred to simply as an optical fiber grating), as an example of an optical waveguide grating according to the first embodiment of the present invention. In the drawing, reference numeral 41 denotes as optical fiber, reference numeral 42 denotes a core, reference numeral 43 denotes a cladding and reference numeral 44 denotes a jacket layer.

This optical fiber grating has a grating portion 45 wherein the refractive index of the core 42 periodically changes in the longitudinal direction of the optical fiber 41 formed in a portion of the optical fiber 41.

The core 42 of the optical fiber 41 is composed of silica glass ($SiO_2$) doped with at least germanium (Ge) and boron (B). Aside from these, the core 42 may also be doped with aluminum, erbium, titanium or the like as suitable. The cladding 43 is composed of a silica glass having a lower refractive index than the core, for example pure silica glass or fluorine-doped silica glass or the like.

When the optical fiber 41 is made by means of a gaseous phase reaction, germanium is actually added to the core 42 in the form of $GeO_2$ (germanium oxide), and boron is added to the core 42 in the form of $B_2O_3$ (boron oxide). The concentration of $GeO_2$ in the core 42 is determined so as to obtain a preferable core-cladding relative refractive index difference in the optical fiber 41 and to allow a desired refractive index change to be obtained in the core 42 by exposing the optical fiber 41 to UV radiation.

As will be explained below, doping the core 42 with $B_2O_3$ improves the temperature characteristics of the optical fiber grating by compensating for the refractive index changes with respect to temperature changes in $GeO_2$-doped silica glass.

Additionally, doping silica glass with $B_2O_3$ reduces the refractive index of the silica glass. Therefore, the $B_2O_3$ concentration in the core 42 is set so as to improve the temperature characteristics of the optical fiber grating depending on the $GeO_2$ concentration in the core 42, and to obtain a desirable core-cladding relative refractive index difference for the optical fiber 41.

However, if the $B_2O_3$ concentration in the core 42 is too high, the temperature characteristics of the optical fiber grating will be degraded so as to exhibit the inverse characteristics, so that the $B_2O_3$ concentration in the core 42 should preferably be set to less than or equal to 2.0 times the $GeO_2$ concentration in the core 42.

Additionally, doping with even a small amount of $B_2O_3$ will, however slight, improve the temperature characteristics of optical fiber gratings. Therefore, the lower bound for the $B_2O_3$ concentration in the core 42 needs only to be larger than 0, and the concentration should preferably be at least 0.5 times the concentration of $GeO_2$ in the core 42.

The properties of the optical fiber grating such as the central wavelength of the rejection band, the rejection bandwidth, and the rejection change depending on parameters such as the amount of change in the core refractive index of the cladding portion 45, the grating pitch, the grating shape (profile of the core refractive index change), and length of the grating portion 45 in the longitudinal direction of the optical fiber 41, and these can be set as needed according to the optical fiber grating characteristics which are desired. Additionally, the grating pitch is set to within a range of tens to hundreds of microns in order to obtain radiative mode-coupling properties.

In order to produce an optical fiber grating of this type, an optical fiber is first made using a commonly known process such as a VAD process or an MCVD process. The core is doped with $GeO_2$ and $B_2O_3$ at this time. Next, the jacket layer 44 of the optical fiber 41 is partially removed, and a grating portion 45 is formed at the portion with the jacket layer removed by periodically exposing with UV radiation along the longitudinal direction of the optical fiber 41.

The wavelength of the UV radiation for irradiating the optical fiber 41 should preferably be about 240–250 nm.

As the method for forming the grating portion 45, a commonly known method may be used, such as a method wherein a UV beam having a comparatively large spot width is irradiated on the optical fiber 41 through a photomask having slits spaced by regular intervals of tens to hundreds of microns, or a method wherein UV beams are irradiated on the optical fiber 41 at regular intervals by repeating the procedure of irradiating a UV beam with a small spot width onto the optical fiber 41 for a constant period of time, cutting off the beam, shifting the position of the beam along the longitudinal direction of the optical fiber 41, and reirradiating the beam.

Below, the functions of an optical fiber grating according to the first embodiment will be explained.

Although radiative mode-coupled optical fiber gratings have a plurality of rejection bands, the condition expressed by the following equation (1) applies to the central wavelength $\lambda_c$ in a single rejection band.

$$\beta_{co} - \beta_{cl} = \frac{2\pi}{\Lambda} \quad (1)$$

Here, $\beta_{co}$ represents the propagation constant for the waveguide mode (of the core), $\beta_{cl}$ represents the propagation constant for the cladding mode, and $\Lambda$ represents the grating pitch.

The above equation (1) can be rewritten as the following equation (2).

$$\lambda_c = \Lambda \cdot (n_{eco} - n_{ecl}) \quad (2)$$

Here, $n_{eco}$ and $n_{ecl}$ represent respectively the effective refractive indices of the waveguide mode and the cladding mode ($2\pi/\Lambda \cdot$effective refractive index=propagation constant).

Differentiating equation (2) by temperature results in the following equation (3).

$$\frac{\partial}{\partial T}\lambda_c = (n_{eco} - n_{ecl}) \cdot \frac{\partial}{\partial T}\Lambda + \Lambda \cdot \frac{\partial}{\partial T}(n_{eco} - n_{ecl}) \quad (3)$$

Then, the central wavelength $\lambda_c$ can be made constant with respect to temperature changes by making both sides of the above equation (3) equal to zero. Since the coefficient of thermal expansion of silica glass in which the main component is silica is extremely small, the derivative $\partial\Lambda/\partial T$ (equal to the coefficient of thermal expansion of glass) can be approximated as zero. Therefore, it is sufficient to make $(\partial/\partial T)(n_{eco} - n_{ecl})$ equal to zero.

Silica glass such as used in the claddings of conventional radiative mode-coupled optical fiber gratings and the germanium-doped silica glass used in their cores both have the property that their refractive indices increase with increases in temperature. Additionally, in optical fibers in general, the effective refractive index for the waveguide mode increases if the refractive index of the material increases.

Since the temperature dependence of the refractive index change in germanium-doped silica glass is greater than the temperature dependence of the refractive index change in silica glass, the condition $\partial n_{eco}/\partial T > \partial n_{ecl}/\partial T$ applies in conventional radiative mode-coupled optical fiber gratings, so that the right side of the above equation (3) cannot be made equal to zero.

In contrast, boron-doped silica glass has the property that the refractive index decreases with increases in temperature. Therefore, the temperature dependence of the refractive index of the core 42 can be made approximately equal to the temperature dependence of the refractive index of the cladding 43 by doping the core 42 not only with germanium, but also with an appropriate amount of boron. As a result, it is possible to make $\partial n_{eco}/\partial T - \partial n_{ecl}/\partial T = 0$, thereby allowing a radiative mode-coupled optical fiber grating wherein the central wavelength of the rejection band has a low temperature dependence to be obtained.

On the other hand, if the concentration of boron in the core is too high, then the temperature characteristics of the radiative mode-coupled optical fiber grating shift to characteristics which are the inverse of the conventional characteristics, such that the central wavelength of the rejection band will shift to shorter wavelengths (longer wavelengths) if the temperature drops (rises). If the concentration of boron in the core 42 exceeds twice the concentration of germanium, the temperature characteristics shift too far toward the inverse characteristics, and therefor this situation should be avoided.

The methods for improving the temperature characteristics of optical fiber gratings by doping the core 42 with boron are not restricted to use with the optical fiber grating of the present example. This method is effective for any optical fiber grating having radiative mode-coupled properties, wherein the core and cladding are composed of silica glass materials, the core is doped with germanium, and the temperature dependence of the refractive index change of the cladding material is lower than the temperature dependence of the refractive index change in the core material. Hence the method can be applied to optical fibers with arbitrary structures.

Second Embodiment

Figure 2:
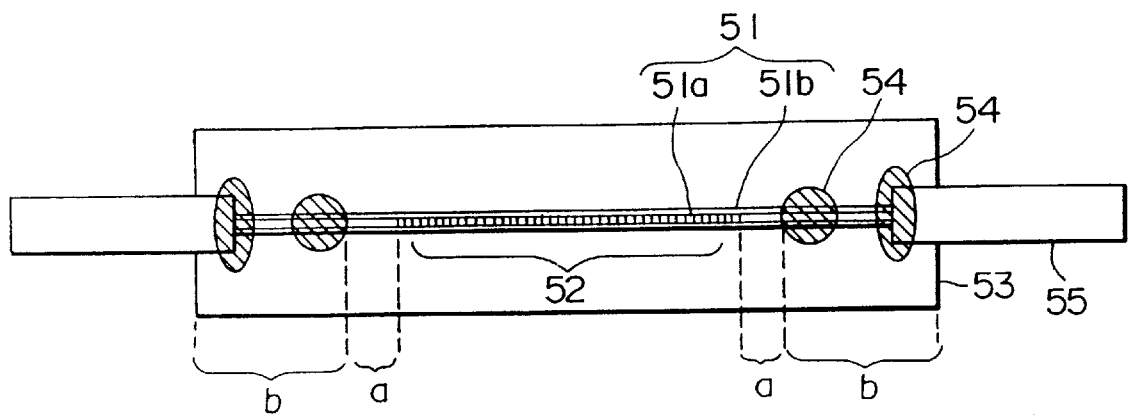
FIG. 2 is a plan view showing an example of an optical waveguide grating according to a second embodiment of the present invention.

FIG. 2 is a plan view showing an example of an optical waveguide grating according to a second embodiment of the present invention. Here, a radiative mode-coupled optical fiber grating (hereinafter referred to simply as an optical fiber grating) will be given as an example of an optical waveguide.

In the drawing, reference numeral 51 denotes an optical fiber, reference numeral 51a denotes a core, reference numeral 51b denotes a cladding, reference numeral 52 denotes a grating portion, reference numeral 53 denotes a substrate, reference numeral 54 denotes an adhesive and reference numeral 55 denotes a jacket layer.

The optical fiber 51 is composed of a core 51a and a cladding 51b with a lower refractive index than the core, and a grating portion 52 having a refractive index which periodically changes along the longitudinal direction of the optical fiber 51 is formed at a portion of the core 51a.

In this example, the optical fiber 51 should preferably be such that a portion of the jacket layer 55 of the resin-coated optical fiber is removed.

Additionally, the grating pitch in the grating portion 52 should preferably be set to within a range of about tens to hundreds of microns in order to obtain radiative mode-coupled properties.

The core 51a of the optical fiber 51 is composed of a material wherein the refractive index changes when exposed to UV radiation, depending on the UV light intensity and the exposure time. The material should preferably be $GeO_2$-doped silica glass. In addition to $GeO_2$, the core 51a may be doped with aluminum, erbium, titanium or the like. The cladding 51b of the optical fiber 51 should preferably be composed of silica glass or fluorine-doped silica glass.

The optical fiber 51 used to make this optical fiber grating may be a single-mode fiber or a multi-mode fiber, but should preferably have single-mode transmission properties in the operative wavelength region of the grating. This is because the existing optical transmission systems mostly use single-mode fibers, so that the use of single-mode fibers allows the connection loss with existing systems to be held low, and because the transmission loss peaks which occur at higher-order modes can be ignored.

The optical fiber 51 is formed so that the mean relative refractive index difference of the core 51a is larger than that of optical communication fibers. Here, the mean relative refractive index difference of the core according to the second embodiment of the present invention refers to the core-cladding relative refractive index difference averaged in the cross-sectional direction, and is defined by the following formula I.

$$\frac{\int_{core} \delta dS}{S_{core}} \quad (I)$$

Here, $S_{core}$ represents the cross-sectional area of the core and $\delta$ is a function which describes the distribution of the relative refractive index. The numerator of the above formula (I) is the integral of this function $\delta$ by dS (area fragments of core cross-section) over only the interior of the core. Taking the distance of an arbitrary point inside the optical fiber from the center of the optical fiber to be r, $\delta$ is a function of r, so that $\delta = \delta(r)$ gives the relative refractive index difference between the center of the core and a point at radius r. If $\delta$ is cylindrically symmetric and the core radius is taken to be R, then the mean relative refractive index difference of the core can be expressed by the following formula (II).

$$\frac{2\int_0^R \delta r \, dr}{R^2} \quad (II)$$

Specifically, as an optical fiber 51 for the present invention, it is possible to use a 1.3 μm zero-dispersion optical fiber, a cutoff wavelength shifted optical fiber or a dispersion shifted fiber. If a 1.3 μm zero-dispersion optical fiber is used, while the mean relative refractive index difference of the cores of 1.3 μm zero-dispersion optical fibers used for communication purposes is usually about 0.35 %, the 1.3 μm zero-dispersion optical fiber used in the second embodiment of the present invention should preferably have a larger mean relative refractive index difference.

When using a cutoff wavelength shifted optical fiber, the mean relative refractive index difference of the core for cutoff wavelength shifted optical fibers for communication purposes is normally 0.4–0.45 %, whereas the cutoff wavelength shifted optical fiber used in the second embodiment of the present invention is formed so as to have a larger mean relative refractive index difference of the core.

If a dispersion shifted optical fiber is used, while the mean relative refractive index difference of the cores of dispersion shifted fibers used for communication purposes is usually about 0.4 %, the dispersion shifted optical fiber used in the second embodiment of the present invention should preferably have a larger mean relative refractive index difference.

The difference in the mean relative refractive index differences between the optical fiber 51 used in the second embodiment of the present invention and communication fibers should be set according to the length of the grating portion 52 (grating length) and the rejection bandwidth of the desired optical fiber grating, because this difference causes the rejection bandwidth of the optical fiber grating to change as will be explained below.

When the grating length is made constant, the rejection bandwidth will decrease as the mean relative refractive index difference of the core of the optical fiber 51 increases as is desirable, but in a single-mode fiber, the mode field diameter of the optical fiber 51 will become small if the mean relative refractive index difference of the core is made too large, so as to result in a problem in that the connection loss for connection to existing systems will be large.

Therefore, the mean relative refractive index difference of the core of the optical fiber 51 used in the second embodiment should be made as large as possible to an extent such as not to result in any such connection loss problems in connected optical waveguides used for communication purposes. Hence, the upper limit is determined by the range of allowable connection losses. For example, when the allowable range of connection losses is less than or equal to approximately 0.2 dB, then the mean relative refractive index difference of the core 51a of the optical fiber 51 should preferably be set to 1.5% or less.

In this example, a 1.3 µm zero-dispersion optical fiber having a core 51a with a mean relative refractive index difference of 0.7% is used, and the radiative mode-coupled optical fiber grating is constructed such that the grating length is 20 mm and the rejection bandwidth is 20 nm.

The optical fiber 51 in which the grating portion 52 is formed is affixed to a substrate 53.

The material of the substrate 53 should be such that the difference in the coefficient of thermal expansion with the optical fiber 51 is small, and a silica substrate is preferable. The shape of the substrate 53 can be arbitrary. The optical fiber 51 should preferably be affixed to the substrate 53 by using an adhesive 54, for example an epoxy adhesive, a UV-hardening adhesive or the like.

Since the grating properties of the radiative mode-coupled grating will change if the adhesive 54 contacts the grating portion 52, the adhesive should be applied at portions other than the grating portion 52, preferably on both sides of the grating portion 52 separated by at least 5 mm from the ends thereof.

In this example, the length of the grating portion 52 is 20 mm, the distance a between the grating portion 52 and the adhesive 54 on both sides is 5 mm, the length b required to affix the optical fiber 51 by applying adhesive 54 is 5 mm on both sides, and a silica tube 40 mm long is used as the substrate 53.

Hereinbelow, an example of a method for producing the optical fiber grating according to the second embodiment will be explained.

Figure 3:
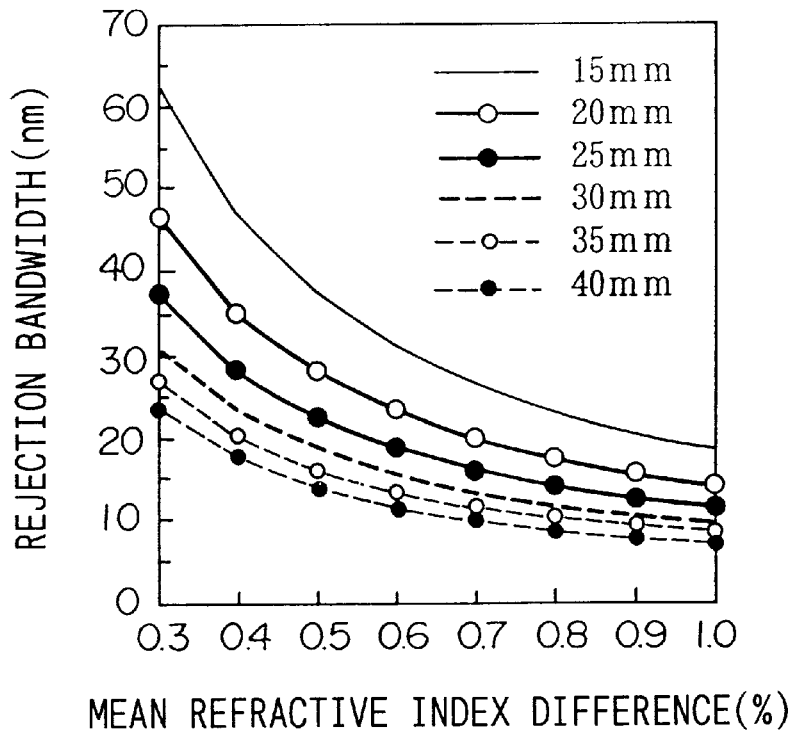
FIG. 3 is a graph showing the relationship between grating length, mean relative refractive index difference of the core, and the rejection bandwidth in an example according to the second embodiment of the present invention.

First, as shown in FIG. 3, the relationships between the grating length, the mean relative refractive index difference of the core and the rejection bandwidth are pre-determined by a calculation method to be explained below, and a mean relative refractive index difference of the core which allows the desired grating length and rejection bandwidth to be achieved simultaneously is determined therefrom.

FIG. 3 is a graph showing the relationship between the mean relative refractive index difference and the rejection bandwidth for the cases wherein the grating length is 15, 20, 25, 30, 35 and 40 mm. In the graph, the horizontal axis represents the mean relative refractive index of the core and the vertical axis represents the results of calculations (theoretical limit values) of the rejection bandwidth.

Below, the method for calculating the rejection bandwidths of radiative mode-coupled optical fibers (theoretical limit values) will be explained.

As mentioned above, radiative mode-coupled gratings are constructed such as to be capable of attenuating the light of the waveguide mode by coupling the waveguide mode (of the core) with the mode propagating through the cladding. The optical power attenuation rate $2\alpha$ of the waveguide mode of such a grating can be expressed by the following equation (4).

$$2\alpha = \sum_m C_m^2 \Phi(\Delta\beta_m) \qquad (4)$$

Here, m represents a cladding mode number to be coupled, $C_m$ represents the coupling constant when coupling the mth mode of the cladding. Additionally, $\Phi(\Delta\beta_m)$ is the square root of the Fourier transform of the grating pattern. When the pattern of the grating portion is regularly spaced, $\Phi(\Delta\beta_m)$ corresponds to the period of the grating (the basic period when the changes in the grating are not sinusoidal) and can be expressed by the following equation (5).

$$\Phi(\Delta\beta_m) = \frac{1}{\nu\Lambda}\left(\frac{4}{\pi}\right)^2 \left(\frac{2\pi/\Lambda}{\Delta\beta_m + 2\pi/\Lambda}\right)^2 \left[\frac{2\sin\left(\frac{\Delta\beta_m \nu\Lambda}{2}\right)}{\Delta\beta_m - 2\pi/\Lambda}\right]^2 \qquad (5)$$

Figure 4:
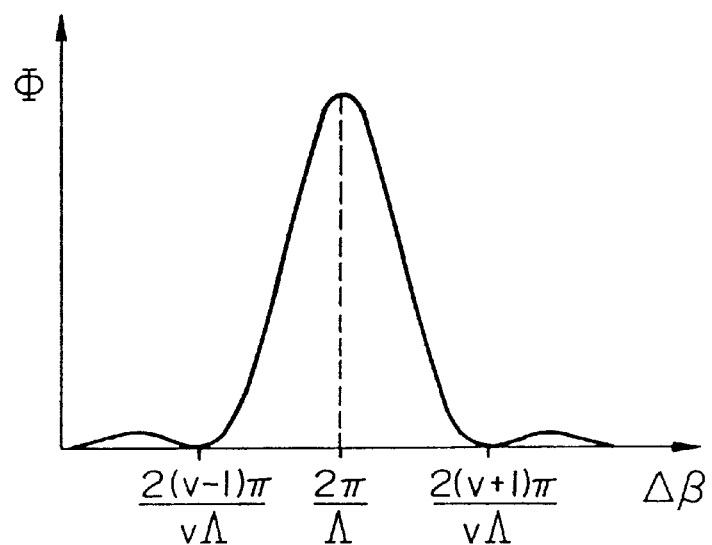
FIG. 4 is a graph for explaining the formula for calculating the rejection bandwidth according to a second embodiment of the present invention.

Here, $\Delta\beta_m$ represents the difference in the propagation constant between the mth mode of the cladding and the mode guided through the core. Additionally, $\Lambda$ represents the grating pitch and $\nu$ represents the number of cycles in the grating. The relationship between $\Phi$ and $\Delta\beta$ in the vicinity of $\Delta\beta=2\pi/\Lambda$ is shown in FIG. 4.

As shown in the drawing, if the wavelengths when $\Delta\beta$ is equal to $2(\nu-1)\pi/\nu\Lambda$ and when $\Delta\beta$ is equal to $2(\nu+1)\pi/\nu\Lambda$ are taken to be respectively $\lambda_l$ and $\lambda_s$, then when the wavelength at the destination of propagation is between $\lambda_l$ and $\lambda_s$ (i.e. when $\Delta\beta$ is between $2(\nu-1)\pi/\nu\Lambda$ and $2(\nu+1)\pi/\nu\Lambda$), the value of $\Phi(\Delta\beta_m)$ in the above equation (5) becomes bound, and the attenuation rate $2\alpha$ becomes large in accordance with the above equation (4). When outside the range of $\lambda_l$ to $\lambda_s$, $\Phi(\Delta\beta_m)$ approaches zero and the attenuation rate $2\alpha$ can be ignored. That is, between $\lambda_l$ and $\lambda_s$, the loss due to the grating is large so as to form a rejection band, and the interval between $\lambda_l$ and $\lambda_s$ is defined to be the rejection bandwidth $\Delta\lambda$.

Furthermore, the relation expressed by the following equation (6) arises.

$$\Delta\beta(\lambda_l) - \Delta\beta(\lambda_s) = \frac{4\pi}{v\Lambda} \quad (6)$$

Equation (6) can then be rewritten as the following equation (7) by using the relation $\lambda_c = (\lambda_l + \lambda_s)/2$.

$$|\Delta\beta(\lambda_c + \Delta\lambda/2) - \Delta\beta(\lambda_c - \Delta\lambda/2)| = \frac{4\pi}{v\Lambda} \quad (7)$$

By approximating with a first-order expansion, the above equation (7) can be rewritten as the following equation (8).

$$\left|\left\{\frac{\partial}{\partial\lambda}\Delta\beta(\lambda_c)\right\}\cdot\frac{\Delta\lambda}{2} - \left\{\frac{\partial}{\partial\lambda}\Delta\beta(\lambda_c)\right\}\cdot\left(-\frac{\Delta\lambda}{2}\right)\right| = \left|\frac{\partial}{\partial\lambda}\Delta\beta(\lambda_c)\right|\cdot\Delta\lambda = \frac{4\pi}{v\Lambda} \quad (8)$$

Further modifying this equation results in the following equation (9).

$$\Delta\lambda = \frac{4\pi}{v\Lambda}\cdot\frac{1}{\left|\frac{\partial}{\partial\lambda}\Delta\beta(\lambda_c)\right|} \quad (9)$$

Taking the grating length to be L, then $L = v\Lambda$, so as to give the following equation (10) which is a formula for calculating the rejection bandwidth.

$$\Delta\lambda = \frac{4\pi}{L}\cdot\frac{1}{\left|\frac{\partial}{\partial\lambda}\Delta\beta(\lambda_c)\right|} \quad (10)$$

In the above equation (10), $\Delta\beta(\lambda_c)$ is the difference between the propagation constant of the waveguide mode of the core and the propagation constant of the cladding mode at the central wavelength $\lambda_c$ of the rejection band. As the mean relative refractive index difference of the core increases, the wavelength derivative of $\Delta\beta(\lambda_c)$, i.e. the denominator in the above equation (10), increases so that the righthand side of the above equation (10) decreases, consequently decreasing the rejection bandwidth ($\Delta\lambda$).

Figure 5:
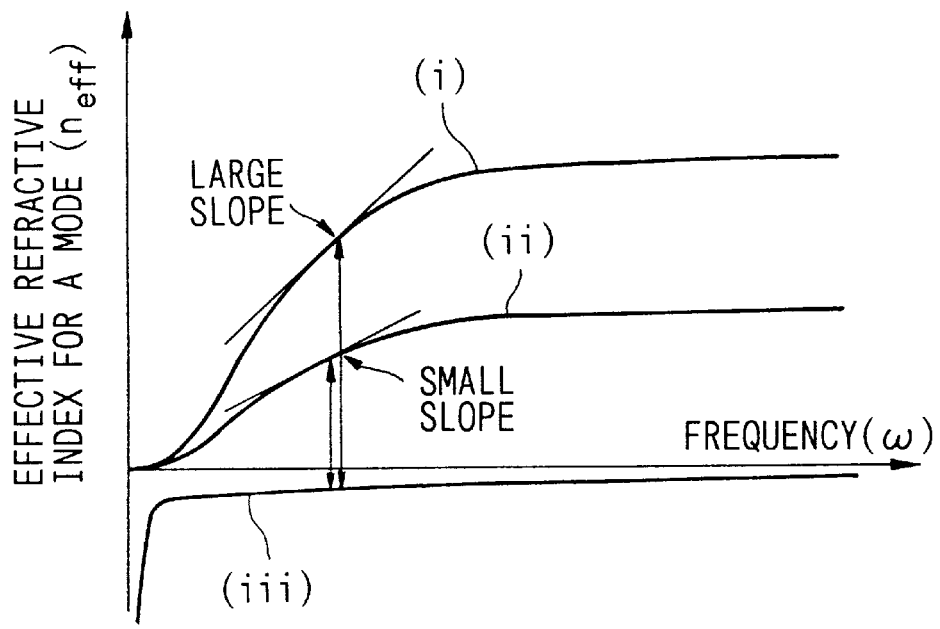
FIG. 5 is a graph showing the relationship between the optical frequency and the effective refractive index for explaining the relationship between the mean relative refractive index difference of the core and the rejection bandwidth in an optical waveguide grating.

FIG. 5 has the optical frequency ($\omega$) on the horizontal axis, the effective refractive index ($n_{eff}$) for the mode on the vertical axis, and shows the relationship therebetween (dispersion curve). In the graph, (i) represents a dispersion curve for a waveguide mode in an optical fiber with a large mean relative refractive index difference of the core, (ii) represents a dispersion curve for a waveguide mode in an optical fiber with a small mean relative refractive index difference of the core, and (iii) represents a dispersion curve for the cladding mode.

As shown in the drawing, when using light of the same frequency ($\omega$), the value (corresponding to the slope of the dispersion curve) of the effective refractive index ($n_{eff}$) of the waveguide mode of the core differentiated by the frequency ($\omega$), i.e. the frequency dependence of the effective refractive indes, is larger in optical fibers having large mean relative refractive index differences of the core than in optical fibers having small mean relative refractive index differences of the core. However, the effective refractive index for the cladding mode is almost unaffected by changes in the mean relative refractive index of the core. This means that the frequency dependence of the difference in effective refractive index for the cladding mode and the waveguide mode of the core is higher for optical fibers with higher mean relative refractive index differences of the core.

The absolute value of the wavelength dependence of the difference in effective refractive index for the cladding mode and the waveguide mode of the core is higher for optical fibers with higher mean relative refractive index differences of the core, because the frequency is proportional to the inverse of the wavelength ($\omega = 2\pi v = 2\pi C/\lambda$). Additionally, since the propagation constant is equal to the effective refractive index times the frequency of light in a vacuum, the absolute value of the wavelength derivative of the difference ($\Delta\beta$) in the propagation constant between the cladding mode and the waveguide mode of the core is greater for optical fibers with larger mean relative refractive index differences.

The conditions of the grating length of the optical fiber grating to be obtained are primarily determined by considering the housability and vibration resistance of the optical fiber grating.

In this example, the grating length is set to 20 mm in order to obtain an optical fiber grating which can be installed and contained in an undersea repeaters.

That is, in order to make an optical fiber grating such as shown in FIG. 2 capable of being contained in an undersea repeaters, the length of the substrate 53 must be 40 mm or less. In the case of a radiative mode-coupled optical fiber grating, an anchoring base of at least 10 mm must be provided on both sides of the grating portion 52 in order to affix it to the substrate 53 by means of an adhesive 54.

Therefore, for fixation to a substrate 53 which is less than 40 mm, the grating length must be held to 20 mm or less.

Figure 6:
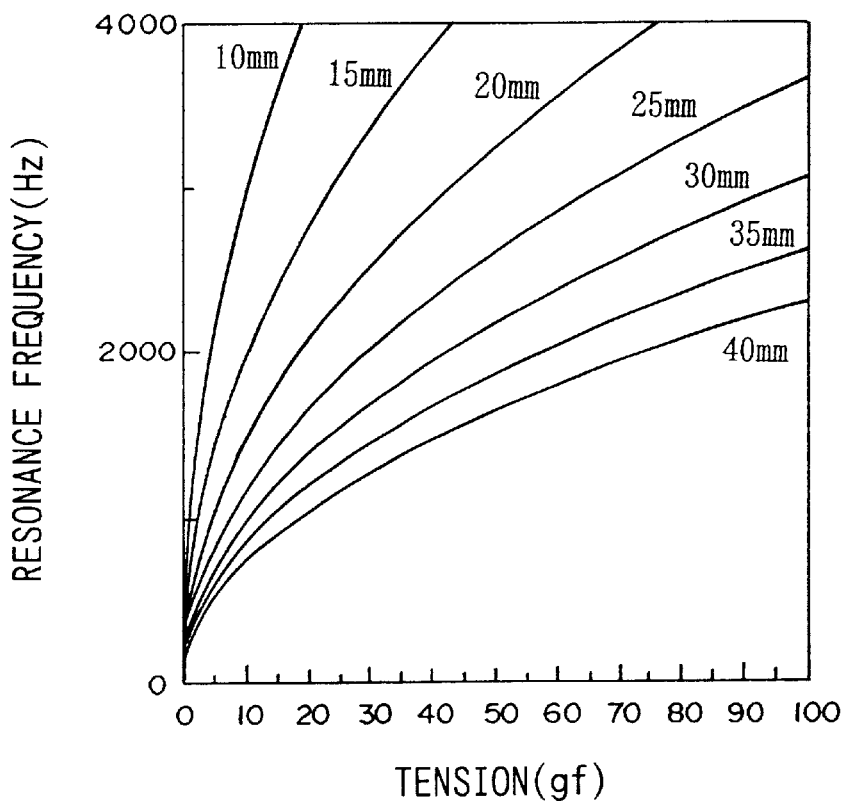
FIG. 6 is a graph showing the relationship between the length of the optical fiber, tension, and the resonance frequency in an optical fiber grating according to a second embodiment of the present invention.
Figure 7:
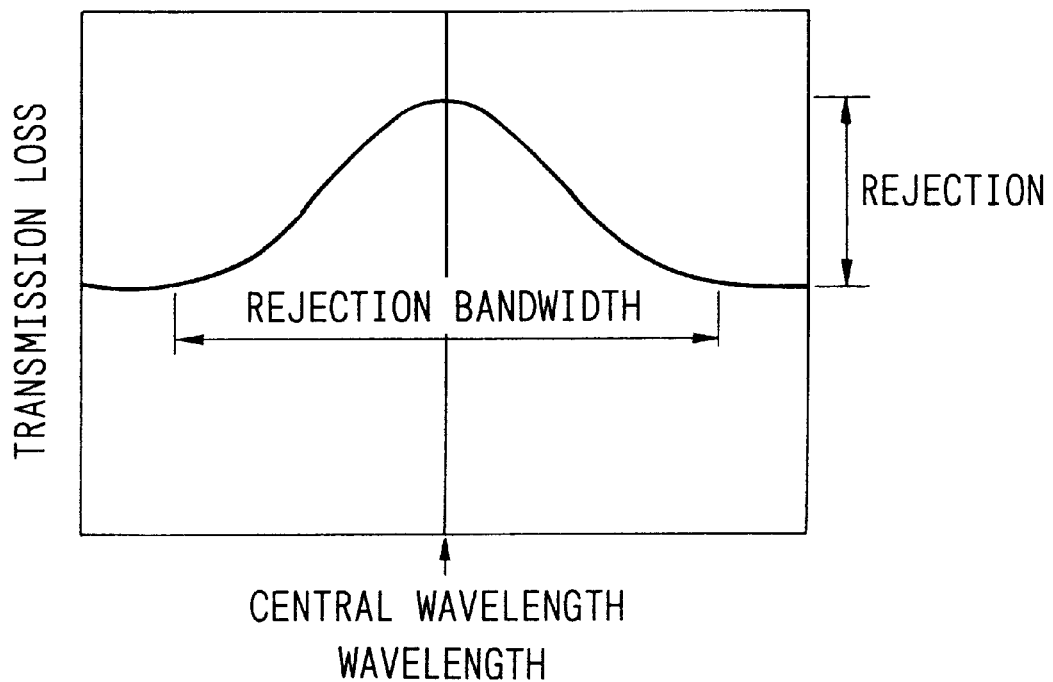
FIG. 7 is a graph showing the properties of a radiative mode-coupled optical waveguide grating.
Figure 8:
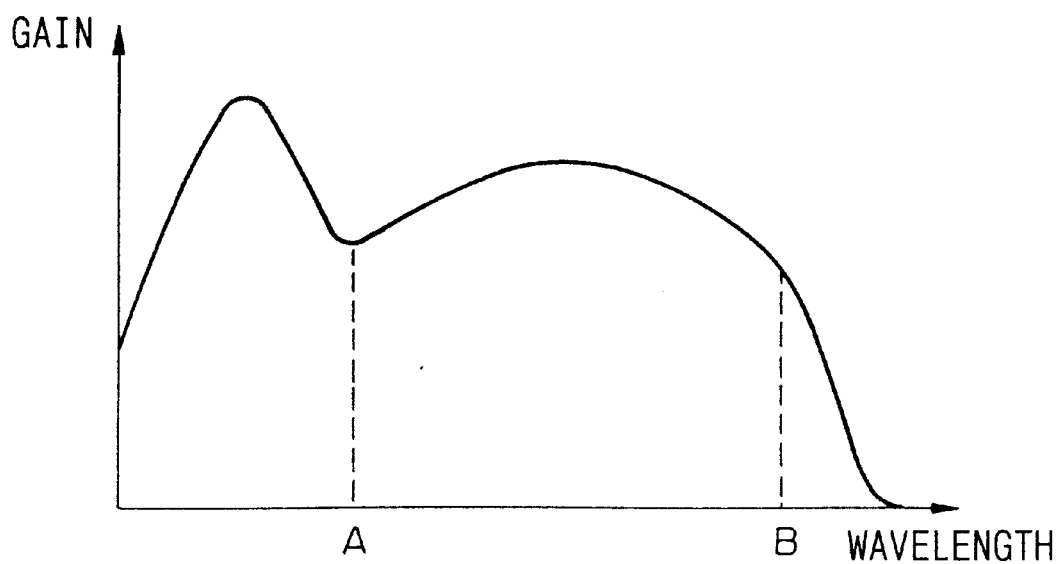
FIG. 8 is a graph showing the wavelength characteristics of gain in an optical fiber amplifier.

Additionally, while the diameter of an optical fiber 51 is usually about 125 $\mu$m, the tension and resonance frequency of a silica glass chord having a diameter of 125 $\mu$m have the relationship shown in FIG. 6. FIG. 6 shows the relationship between the tension and resonance frequency of silica glass chords which are respectively 10, 15, 20, 25, 30, 35 and 40 mm long.

Generally, when conducting vibration tests of optical components, the upper limit of the vibrations is made 2000 Hz because the frequencies of the vibrations occurring when installing cables or repeaters are less than 2000 Hz. With regard to the vibration resistance of optical fiber gratings, it is possible to prevent the occurrence of breakage due to resonance of the optical fiber during the vibration tests or during installation if the design is such that the resonance frequency is at least 2000 Hz.

As mentioned above, the length of the substrate 53 must be restricted to 40 mm or less in order to allow the optical fiber grating to be contained in an undersea repeaters. The length b of the portion coated with adhesive 54 in order to affix the optical fiber grating must be at least 5 mm long at both ends, so that the length of the optical fiber between adhesive fixation points cannot be made longer than approximately 30 mm.

On the other hand, the reliability of the optical fiber 51 becomes a problem when the tension on the optical fiber grating is too large, so that it should preferably be used in an environment wherein the tension is less than ¼–⅕ of 200 gf which is the proof strength. Therefore, the tension on the optical fiber grating must be 40–50 gf or less.

Hence, in order to make the resonance frequency greater than 2000 Hz under the conditions that the upper limit of the tension on the optical fiber grating is 40–50 gf and the length of the optical fiber between adhesive fixation points cannot be larger than 30 mm, the length of the optical fiber grating between adhesive fixation points must be less than or equal to approximately 30 mm as shown in FIG. 6. Additionally, the grating length should preferably be 20 mm or less because the distance a between the grating portion 52 and the adhesive 54 should be at least 5 mm.

The conditions of the rejection bandwidth of the optical fiber grating to be obtained are determined by the method of use of the optical fiber grating.

For example, in an optical communication system performing wavelength-multiplexed transmissions, the design should be such as to make the rejection bandwidth equivalent to the bandwidth of the wavelength band used for transmissions in the case of a radiative mode-coupled optical fiber grating used to reduce the wavelength dependence of the gain of an erbium-doped optical fiber amplifier. In this example, the rejection bandwidth should preferably be set to 20 nm.

The most suitable mean relative refractive index difference of the core 51a of the optical fiber 51 used to make the grating is determined with respect to grating length and rejection bandwidth conditions decided in this way.

In this example, as can be seen from the graph in FIG. 3, the mean relative refractive index difference of the core 51a should be at least 0.7% in order to obtain a radiative mode-coupled optical fiber grating with a grating length of 20 mm or less and a rejection bandwidth of 20 nm.

After a suitable mean relative refractive index difference of the core 51a of the optical fiber 51 has been determined, an optical fiber 51 satisfying these conditions is prepared and a grating portion 52 is formed in a portion thereof by periodically changing the core refractive index.

When making the grating portion 52, the parameters of the optical fiber grating to be obtained other than the grating length are set as appropriate depending on the grating properties to be obtained, since these parameters change the central wavelength and the rejection.

Although the method for forming the grating portion 52 is not restricted, the core 51a of the optical fiber 51 is composed of a material with a refractive index which can be changed by exposure to UV radiation in the present example, so that the grating portion 52 can be formed as desired by periodically exposing the optical fiber 51 to UV radiation along the longitudinal direction.

The wavelengths of the UV beams irradiated on the optical fiber 51 should preferably be about 200–300 nm, and as an optical source, a KrF laser (wavelength 248 nm) can be used.

Additionally, the grating portion 52 can be formed by suitably using conventional methods, such as by irradiating the optical fiber 51 with a UV beam having a comparatively large spot width through a photomask having slits spaced at uniform intervals of tens to hundreds of microns, or by irradiating UV beams onto the optical fiber 51 at regular intervals by repeating the procedure of irradiating a UV beam with a small spot width onto the optical fiber 51 for a constant period of time, cutting off the beam, shifting the position of the beam along the longitudinal direction of the optical fiber 51, and reirradiating the beam.

The optical fiber 51 can also be treated by hydrogenation before irradiation with UV light. In an optical fiber with a core 51a having a germanium concentration of less than a few percent, a pre-hydrogenation treatment should be performed in order to obtain a sufficient core refractive index change by means of exposure to UV light. This hydrogenation treatment can be performed by holding the optical fiber 51 inside a hydrogen-pressurized container adjusted to approximately 100 atm and 50° C.

However, this hydrogenation treatment is not essential, and if the germanium concentration in the core 51a is on the order of 30% and the rejection of the optical fiber grating may be relatively low, then it is possible to omit the treatment.

When a hydrogenation treatment of this type has been performed prior to exposure to UV radiation, the hydrogen in the optical fiber 51 should preferably be removed after the grating portion 52 has been formed. This dehydrogenation process can be performed by leaving the optical fiber 51 in a temperature of between room temperature and 100° C. for a few days. This dehydrogenation process is effective in preventing changes in the grating properties which can occur over time after the grating portion 52 has been made, due to the occurrence of refractive index changes in the hydrogen added to the optical fiber 51 prior to exposure to UV radiation.

An optical fiber grating is completed by adhesively fixing the optical fiber 51 onto a substrate 53 after the grating portion 52 has been formed.

With the optical fiber grating of this example, it is possible to make the rejection bandwidth narrower without increasing the grating length by means of increasing the mean relative refractive index difference of the core of the optical fiber 51.

Additionally, when producing the optical fiber grating, the relationship between the grating length, the mean relative refractive index difference of the core, and the rejection bandwidth can be determined by means of the above-mentioned calculations, based on which suitable values of the mean relative refractive index difference can be selected, thereby allowing an optical fiber grating having a desired grating length and rejection bandwidth to be easily and reliably obtained.

Third Embodiment

In the third embodiment, the term optical waveguide refers to those having a core surrounded by a cladding having a lower refractive index than the core, including embedded palnar optical waveguides having a cladding layer formed on a substrate and a core with a higher refractive index than the cladding layer formed inside the cladding layer, as well as optical fibers.

The optical waveguide gratings according to the third embodiment have periodic changes in the waveguide structure along the direction of propagation of these optical waveguides, and exhibit radiative mode-coupling properties.

As specific features for forming the waveguide structure of the optical waveguide, there are the core diameter (core width), core refractive index and refractive index difference, of which it is most preferable to use the core width (hereinafter defined as the size of the core in a direction normal to the direction of propagation and parallel to the substrate), with which periodic changes can be easily formed.

In this third embodiment, when a palnar optical waveguide is used as the optical waveguide, the core thickness refers to the size of the core in a direction normal to the direction of propagation and normal to the substrate, and the cladding thickness refers to the distance from the core surface to the cladding surface measured in the same direction as the core thickness. When an optical fiber is used, the core thickness refers to the core diameter, and the cladding thickness refers to the distance from the circumferential surface of the core to the circumferential surface of the cladding.

Below, a radiative mode-coupled optical waveguide grating (hereinafter sometimes referred to simply as a palnar optical waveguide grating) will be explained as an example of the third embodiment.

Figure 9:
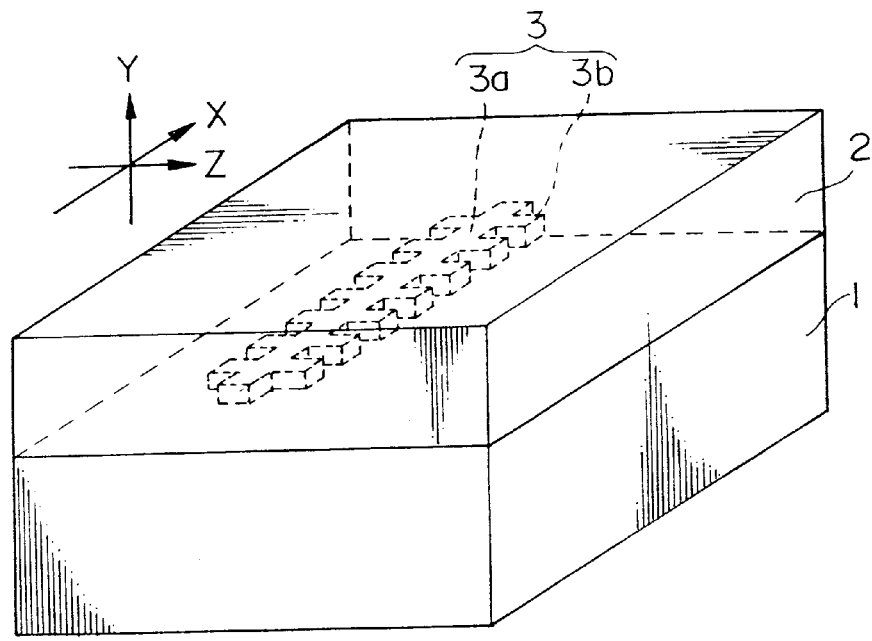
FIG. 9 is a perspective view showing a first example of an optical waveguide grating according to the third embodiment of the present invention.
Figure 10:
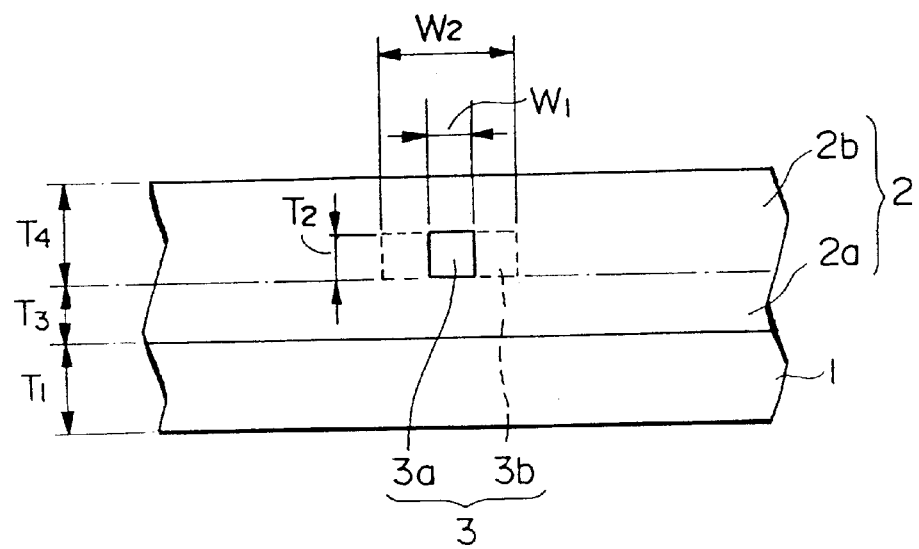
FIG. 10 is a front view showing a first example of an optical waveguide grating according to the third embodiment of the present invention.

FIGS. 9 and 10 show a palnar optical waveguide grating in accordance with the present example; FIG. 9 is a perspective view and FIG. 10 is a front view. Reference numeral 1 denotes a substrate.

A cladding layer 2 is formed on the substrate 1, and a core 4 is formed inside the cladding layer 2. That is, the structure comprises a core 3 surrounded by a cladding layer 2.

The substrate 1 is a flat plate composed of a material having the same refractive index as the cladding layer 2, for which a silica glass substrate is preferable.

The core 3 has a grating structure wherein the width periodically changes along the direction of light propagation (indicated by an X in FIG. 9). That is, the core 3 comprises a strip-shaped trunk portion 3a extending along the direction of light propagation on top of the substrate 1, and rectangular branch portions 3b extending from the trunk portion 3a in the width direction of the core 3 (indicated by a Z in FIG. 9) spaced by predetermined uniform intervals along the direction of light propagation.

The cladding layer 2 comprises a lower cladding layer 2a formed beneath the core 3 on top of the substrate 1, and an upper cladding layer 2b formed above this lower cladding layer 2a, i.e. on top and to the sides of the core 3.

The material of the core 3 is composed of $SiO_2$ (silica glass) doped with germanium (Ge), boron (B), phosphorus (P) or the like, while the material of the cladding layer 2 is composed of $SiO_2$ doped with B, P or the like, such that the lower cladding layer 2a and the upper cladding layer 2b are composed of the same material. The refractive index of the core 3 is higher than the refractive index of the cladding layer 2. The relative refractive index difference between the core 3 and the cladding layer 2 can be set as appropriate, e.g. preferably, it should be set such that $\Delta=0.3\%$.

In this example, the thicknesses of the substrate 1, the lower cladding layer 2a and the core 3 in a direction normal to the substrate 1 and a direction normal to the direction of light propagation (indicated by Y in the drawing) should preferably be such that the thickness $T_1$ of the substrate 1 is 1 mm, the thickness ($T_2$) of the core 3×the width ($W_1$) of the trunk portion 3a is 8 μm×8 μm, the width ($W_2$) of the branch portions 3b of the core 3 are 5 μm, the thickness $T_3$ of the lower cladding layer 2a is 10 μm, and the thickness $T_4$ of the upper cladding layer 2b is 110 μm. These dimensions can be changed as suited to the required properties and functions.

A palnar optical waveguide grating of this type of structure can be produced in the following manner.

FIGS. 11A–11D show the steps in a method for producing a palnar optical waveguide grating according to this example.

Figure 11A:
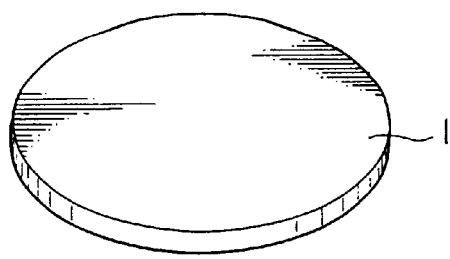
FIGS. 11A–11D are perspective views showing a first example of a production method for an optical waveguide grating according to a third embodiment of the present invention.

First, as shown in FIG. 11A, a substrate 1 is prepared and the surface is cleansed.

Figure 11B:
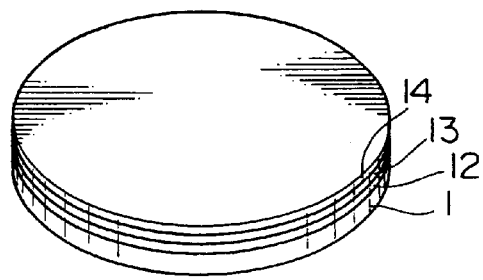

Next, as shown in FIG. 11B, a first cladding glass layer 12 to become the lower cladding layer 2a is formed on top of the substrate 1, then a core glass layer 13 to become the core 3 is formed thereon. Each of these glass layers can be formed by depositing glass soot on top of the substrate 1 by means of an FHD process (flame hydrolysis deposition), then making the glass soot transparent by sintering the substrate 1 with the glass soot at 1290° C. in a helium (He) and oxygen ($O_2$) atmosphere.

Then, a Si resist film 14 is formed on top of this core glass layer 13. This Si resist film can be formed by means of Ar sputtering accumulation process.

Figure 11C:
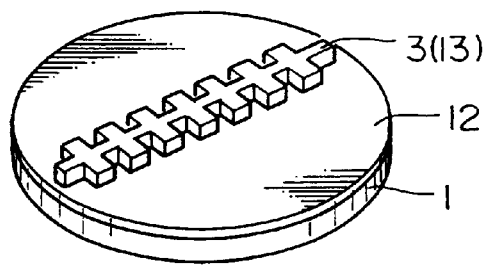

Thereafter, the core glass layer 13 is etched by means of a conventional photolithography process to shape the core 3 into the pattern shown in FIG. 11C. This pattern can be formed by, for example, first forming a photoresist layer on top of the Si resist film 14, exposing to light through a mask pattern corresponding to the shape of the core 3, then forming the pattern of the core 3 on the Si resist film 14 by means of etching. Subsequently, reactive ion etching (RIE) is performed with the Si resist film 14 as a mask to form the core glass layer 13 into the shape of the core 3.

Figure 11D:
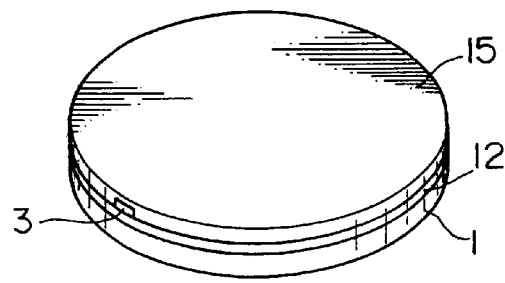

Next, as shown in FIG. 11D, a second cladding glass layer 15 to become the upper cladding layer 2b is formed on top of the first cladding glass layer 12 and the patterned core 3. The second cladding glass layer 15 is formed by the same method as the first cladding glass layer 12. The second cladding glass layer 15 is formed so as to have a predetermined thickness thicker than that of the core 3, so that the core 3 is embedded inside the first cladding glass layer 12 and the second cladding glass layer 15. Additionally, both the first cladding glass layer 12 and the second cladding glass layer 15 are composed of a material having a lower refractive index than the core 3, and the core 3 embedded in this way forms an optical waveguide with a grating structure.

The substrate 1 having an optical waveguide formed by the core 3 in this way has the area around the core 3 cut into a desired shape depending on need, so as to form an optical component such as an optical filter.

Below, the functions of the palnar optical waveguide grating of this example will be explained.

In a conventional radiative mode-coupled palnar optical waveguide grating, the rejection simply changes periodically and cannot be made higher than a certain value even if the grating length is increased. This is believed to be because of the occurrence of recoupling from the cladding mode due to the thinness of the cladding layer. That is, with a palnar optical waveguide structure, the width of the cladding layer on both sides of the core is usually made sufficiently large, but the thickness of the cladding layer on both sides of the core is only about 3–4 times the thickness of the core, which is relatively small.

In contrast, with the palnar optical waveguide grating of the present example, the refractive index of the substrate 1 is equal to that of the cladding layer 2, so that the substrate 1 acts as a cladding for the optical waveguide structure. Consequently, the effective thickness of the cladding underneath the core 3 is equal to the sum of the thickness $T_3$ of the lower cladding layer 2a and the thickness $T_1$ of the substrate 1. Therefore, in this example, the thickness of the cladding underneath the core 3 can be made approximately 125 times as thick as the thickness of the core 3 simply by using a silica glass substrate for the substrate 1. As a result, the recoupling from cladding modes to core propagation modes due to the thinness of the lower cladding layer 2a can be reduced, and the rejection of the radiative mode-coupled optical waveguide grating can be increased.

Additionally, since the palnar optical waveguide grating of this example allows the rejection to be increased simply by using silica glass for the substrate 1, it can be easily achieved without any large changes to the process for producing the palnar optical waveguide. Therefore, it offers an advantage in terms of cost because there is no need for extra funds to install new production equipment.

Additionally, it is possible to effectively increase the rejection by increasing the thickness $T_4$ of the upper cladding layer 2b in addition to essentially increasing the thickness of the lower cladding layer 2a by making the refractive index of the substrate 1 equal to that of the cladding layer 2. As such a method for making the upper cladding layer 2b thicker, the glass soot can be deposited more thickly if this layer is formed by means of a FHD process.

In this case, the thickness ($T_4-T_2$) of the cladding layer 2 above the core 3 should preferably be set so as to be at least 13 times the thickness $T_2$ of the core 3. The thicker the cladding layer 2, the higher the rejection.

However, if the upper cladding layer 2b is made too thick, the production efficiency will drop and the production costs will increase. Therefore, it is possible to obtain a desirable rejection and to offer an advantage in terms of cost by simply increasing the thickness of the lower cladding layer 2a and setting the thickness $T_4$ of the upper cladding layer 2b within a range such as to allow the properties of a radiative mode-coupled gratings to be obtained, depending on the method of use of the palnar optical waveguide grating.

Furthermore, while a palnar optical waveguide was used as an optical waveguide for the above-given first example, the effect of increasing the rejection can also be obtained in a radiative mode-coupled optical fiber grating by similarly increasing the thickness of the cladding with respect to the core. Normally, the thickness of the cladding in an optical fiber used in an optical fiber grating is about 15 times the core diameter, but the rejection can be effectively increased as long as the thickness of the cladding is at least 13 times the core diameter.

Hereinbelow, a second example of the third embodiment will be explained by using the example of a radiative mode-coupled palnar optical waveguide grating.

Figure 12A:
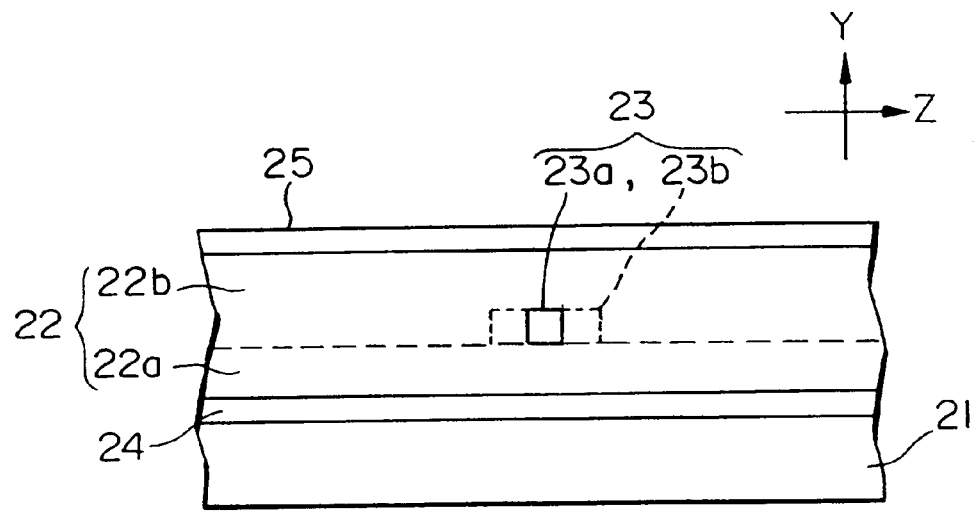
FIG. 12A is a front view showing a second example of an optical waveguide grating according to a third embodiment of the present invention.
Figure 12B:
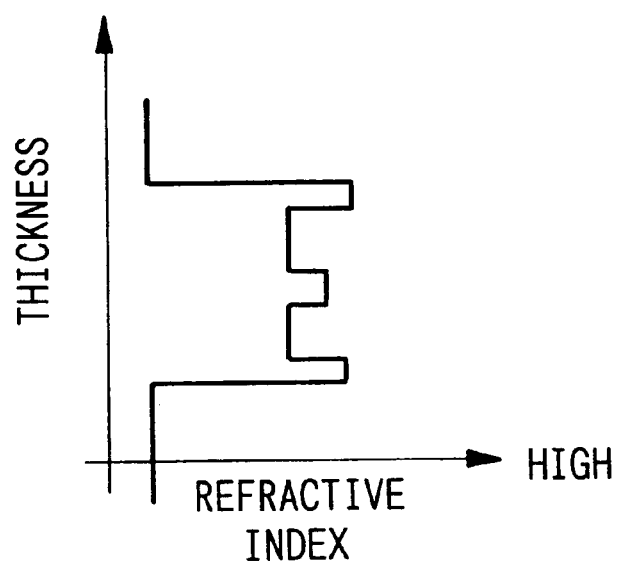
FIG. 12B is a graph showing the refractive index change of a second example of an optical waveguide grating according to a third embodiment of the present invention.

FIG. 12A shows a front view of a palnar optical waveguide grating according to this example, and FIG. 12B is a graph of the refractive index change in the thickness direction across the core. Reference numeral 21 denotes a substrate.

A cladding mode absorption layer 24, a cladding layer 22 and a cladding mode absorption layer 25 are sequentially deposited onto a substrate 21, and a core 23 is formed inside the cladding layer 22. That is, the core 23 is surrounded by the cladding layer 22. The substrate 21 is a flat plate, for which various materials can be used such as silica glass substrates and silicon substrates (Si).

As with the above-given first example, the core 23 has a width that periodically changes along the direction of propagation so as to form a grating structure. That is, the core 23 comprises a strip-shaped trunk portion 23a which extends along the direction of propagation on top of the substrate 21, and rectangular branch portions 23b which extend from the trunk portion 23 in the width direction (indicated by a Z in the drawing) spaced by uniform intervals along the direction of light propagation.

The cladding layer 22 comprises a lower cladding layer 22a formed underneath the core 23 and an upper cladding layer 22b formed on top of the lower cladding layer 22a, i.e. above and to the sides of the core 23.

The material of the core 23 is composed of $SiO_2$ (silica glass) doped with germanium (Ge), boron (B), phosphorus (P) or the like, while the material of the cladding layer 22 is composed of $SiO_2$ doped with B, P or the like, such that the lower cladding layer 22a and the upper cladding layer 22b are composed of the same material. The refractive index of the core 23 is higher than the refractive index of the cladding layer 22. The relative refractive index difference between the core 23 and the cladding layer 22 can be set as appropriate, e.g. it should preferably be set such that $\Delta=0.3\%$.

Cladding mode absorption layers 24 and 25 are formed on both outer sides in the thickness direction of the cladding layer 22 (indicated by a Y in the drawing), i.e. between the cladding layer 22 and the substrate 21, and on the upper surface of the cladding layer 22. As shown in FIG. 12B, these cladding mode absorption layers 24 and 25 are formed so as to have a higher refractive index than the cladding layer 22, and may be composed of $SiO_2$ doped with germanium (Ge), boron (B), phosphorus (P) or the like. The relative refractive index difference between the cladding mode absorption layers 24 and 25 and the cladding layer 22 should preferably be such that $\Delta=1-5\%$. Additionally, the thickness of the cladding mode absorption layers 24 and 25 should be set as appropriate depending on the grating properties to be obtained, since the wavelengths of light absorbed and attenuated by the cladding mode absorption layers 24 and 25 change therewith.

A palnar optical waveguide grating with this type of structure can be made as follows.

FIGS. 13A–13E show the steps in a method for producing a palnar optical waveguide grating according to the present example.

Figure 13A:
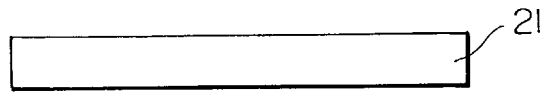
FIGS. 13A–13E are front views showing a second example of a production method for an optical waveguide grating according to a third embodiment of the present invention.

First, as shown in FIG. 13A, a substrate 21 is prepared and the surface is cleansed. If an Si substrate is used, the an RCA cleansing method should preferably be used.

Figure 13B:
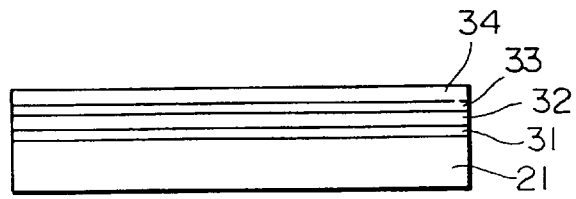

Next, as shown in FIG. 13B, a high refractive index glass layer 31 to become the cladding mode absorption layer 24, a first cladding glass layer 32 to become the lower cladding layer 22a, and a core glass layer 33 to become the core 23 are sequentially formed over the substrate 21. These glass layers can be formed by depositing glass soot onto the substrate 21 by means of an FHD process (flame hydrolysis deposition), then making the glass soot transparent by sintering the substrate 21 with the glass soot at 1290° C. in a helium (He) and oxygen ($O_2$) atmosphere.

The refractive index glass layer 31 can be formed by depositing a predetermined thickness of glass soot while adding dopant materials such as to make the refractive index higher than that of the cladding layer 22 when depositing glass soot by means of an FHD process. Alternatively, it can be formed during the process for forming the first cladding glass layer 32 by adding a dopant material for raising the refractive index for the first few minutes during the deposition of glass soot.

Then, an Si resist film 34 is formed on top of this core glass layer 33. This Si resist film 34 can be formed by means of an Ar sputtering accumulation process.

Figure 13C:
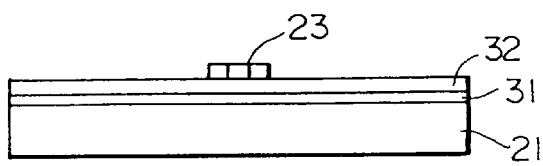

Thereafter, the core glass layer 33 is etched by means of a conventional photolithography process to shape the core 23 into the pattern shown in FIG. 13C. This pattern can be formed by, for example, first forming a photoresist layer on top of the Si resist film 34, exposing to light through a mask pattern corresponding to the shape of the core 23, then forming the pattern of the core 23 on the Si resist film 34 by means of etching. Subsequently, reactive ion etching (RIE) is performed with the Si resist film 34 as a mask to form the core glass layer 33 into the shape of the core 23.

Figure 13D:
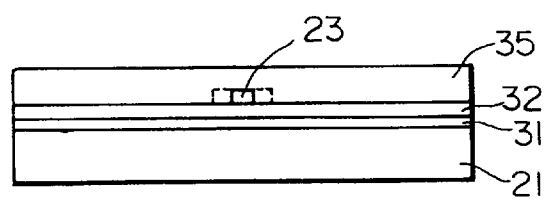

Next, as shown in FIG. 13D, a second cladding glass layer 35 to become the upper cladding layer 22b is formed on top of the first cladding glass layer 32 and the patterned core 23. The second cladding glass layer 35 is formed by the same method as the first cladding glass layer 32. The second cladding glass layer 35 is formed so as to have a predetermined thickness thicker than that of the core 23, so that the core 23 is embedded inside the first cladding glass layer 32 and the second cladding glass layer 35. Additionally, both the first cladding glass layer 32 and the second cladding glass layer 35 are composed of a material having a lower refractive index than the core 23, and the core 23 embedded in this way forms an optical waveguide with a grating structure.

Figure 13E:
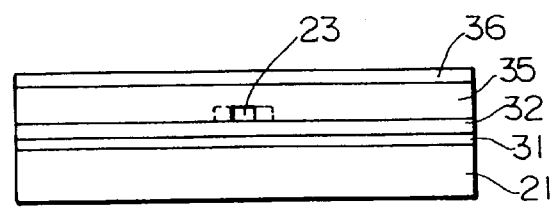

Subsequently, as shown in FIG. 13E, a high refractive index glass layer 36 to become the cladding mode absorption layer 25 is formed on the second cladding glass layer 35.

This high refractive index glass layer 36 can be formed by depositing a predetermined thickness of glass soot while adding a dopant material for increasing the refractive index so as to be higher than that of the cladding layer 22 while glass soot is being deposited by means of an FHD process. Alternatively, it can be formed during the process for forming the second cladding glass layer 35 by adding a dopant material for raising the refractive index for the last few minutes during the deposition of glass soot.

The substrate 21 having an optical waveguide formed by the core 23 in this way has the area around the core 23 cut into a desired shape depending on need, so as to form an optical component such as an optical filter.

Hereinbelow, functions of the palnar optical waveguide grating of the present example will be explained.

The palnar optical waveguide grating of the present example has cladding mode absorption layers 24 and 25 with a refractive index higher than the cladding layer 22 formed on both outer sides of the cladding layer 22 in the thickness direction. The cladding modes are coupled to these cladding mode absorption layers 24 and 25 so as to be efficiently absorbed and attenuated. As a result, the recoupling of cladding modes from the cladding layer 22 can be reduced, thereby allowing the rejection of the radiative mode-coupled optical waveguide grating to be increased.

Additionally, in the palnar optical waveguide grating of the present example, the wavelengths of the cladding modes which are absorbed and attenuated by the cladding mode absorption layers 24 and 25 change with the thickness of the cladding mode absorption layers 24 and 25. Therefore, the wavelength selectivity for the light to be attenuated by this palnar optical waveguide grating can be improved by appropriately setting the thicknesses of the cladding mode absorption layers 24 and 25.

While cladding mode absorption layers 24 and 25 were provided on both outer sides of the cladding layer 22 in the second example, it is possible to gain the effects of increasing the rejection and improving the wavelength selectivity by providing only one of the two cladding mode absorption layer 24 or 25. However, these effects can be attained more efficiently by providing both cladding mode absorption layers 24 and 25.

For example, in palnar optical waveguide gratings of the structure shown in FIGS. 9 and 10, it is possible to obtain a structure with a cladding mode absorption layer on one outer side of the cladding layer 2 by using a substrate 1 with a higher refractive index than the cladding layer 2.

Furthermore, while a palnar optical waveguide was used as an optical waveguide in the above-described second example, it is also possible to gain effects of increasing the rejection and improving the wavelength selectivity in a radiative mode-coupled optical fiber grating by similarly forming a cladding mode absorption layer with a higher refractive index than the cladding around the cladding.

In this case, as methods for forming a cladding mode absorption layer around the cladding of the optical fiber, there is a method wherein a high refractive index coating material is used when forming a coating layer around the cladding, or a method which can be used when the optical fiber preform is formed by means of an FHD process, wherein after the cladding portion is formed and sintered, glass soot containing a dopant for raising the refractive index is deposited around the cladding portion for sintering.

Next, Examples 1 and 2 in accordance with the first embodiment of the present invention and Comparative Example 1 will be explained.

EXAMPLE 1

First, an optical fiber comprising a core composed of silica glass doped with 12% mol of $GeO_2$ and 8% mol of $B_2O_3$, and a cladding composed of (pure) silica glass was prepared. Next, after removing a portion of the jacket layer of the optical fiber, the optical fiber was irradiated through a photomask having slits formed therein with UV light of wavelength 248 nm at the portion with the jacket layer removed to form a grating portion. The grating pitch Λ was 400 μm and the overall length of the grating portion was 20 mm.

The optical fiber grating obtained in this manner had the properties of a radiative mode-coupled grating, and the central wavelength of the rejection band was 1560.0 nm at room temperature.

Upon analyzing the temperature dependence of the central wavelength in a temperature range of −20 to 80° C., it was found to be 0.01 nm/°C. for this optical fiber grating.

EXAMPLE 2

An optical fiber grating was made in a manner identical to that of the above-described Example 1, with the exception that an optical fiber comprising a core composed of silica glass doped with 8% mol $GeO_2$ and 16 % mol $B_2O_3$ and a cladding composed of (pure) silica glass was used as the optical fiber.

The resulting optical fiber grating had the properties of a radiative mode-coupled grating, and the central wavelength of the rejection band was 1538 nm at room temperature. Upon analyzing the temperature dependence of the central wavelength in a temperature range of −20 to 80° C., it was found to be −0.045 nm/°C. for this optical fiber grating, thus exhibiting the inverse properties with respect to Example 1.

COMPARATIVE EXAMPLE 1

As a comparative example, an optical fiber grating was made using an optical fiber with a core not doped with $B_2O_3$.

An optical fiber grating was made in a manner identical to that of the above-described Example 1, with the exception that an optical fiber comprising a core composed of silica glass doped with 4.0% mol $GeO_2$ and a cladding composed of (pure) silica glass was used as the optical fiber.

The resulting optical fiber grating had the properties of a radiative mode-coupled grating, and the central wavelength of the rejection band was 1490 nm at room temperature. Upon analyzing the temperature dependence of the central wavelength in a temperature range of −20 to 80° C., it was found to be 0.052 nm/°C. for this optical fiber grating.

The results of Examples 1 and 2 and Comparative Example 1 demonstrate that the temperature dependence of the central wavelength of the rejection band for the optical fiber grating can be improved over the case wherein the core is not doped with $B_2O_3$ by using a silica glass optical fiber wherein the core is doped with $B_2O_3$ in addition to $GeO_2$.

Additionally, as shown in Example 2, it is possible to realize an optical fiber grating wherein the temperature dependence of the central wavelength of the rejection band exhibits characteristics which are the inverse of conventional characteristics, depending on the concentration by which the core is doped with $B_2O_3$.

While the above-explained examples were radiative mode-coupled optical waveguide gratings using optical fibers as the optical waveguides, the temperature dependence of the central wavelength of the rejection band can be increased according to the same principles in the case wherein a planar optical waveguide is used as the optical waveguide.

Next, Example 3 in accordance with the second embodiment of the present invention and Comparative Example 2 will be explained.

EXAMPLE 3

First, a 1.3 μm zero-dispersion optical fiber comprising a core composed of silica glass doped with $GeO_2$ and a cladding composed of pure silica glass, having a core with a mean relative refractive index difference of 1.0%, was prepared. After irradiating this optical fiber with UV light (wavelength 248 nm) having a spot width of 200 μm, the irradiation was stopped, then the irradiation position was moved along the longitudinal direction of the optical fiber for a subsequent irradiation, and this operation was repeated in order to form the grating portion. The grating pitch was 400 μm, and the grating length was 20 mm.

The resulting optical fiber grating had the properties of a radiative mode-coupled grating, with a rejection bandwidth of 15 nm.

COMPARATIVE EXAMPLE 2

First, a 1.3 μm zero-dispersion optical fiber for communication purpose comprising a core composed of silica glass doped with $GeO_2$ and a cladding composed of pure silica glass. This optical fiber had a mean relative refractive index difference of the core of approximately 0.35%.

A grating portion was formed on this optical fiber by the same method as the above-given Example 3. The grating pitch was 400 μm as with Example 3. Even when the grating length was made 40 mm which is twice that of Example 3, the rejection bandwidth could only be made as narrow as approximately 20 nm.

In the above examples, grating portions were formed by periodically changing the core refractive index, but the structure of the grating portion can be any arbitrary structure as long as it results in a radiative mode-coupled grating which satisfies the above equation (4).

Additionally, there is no restriction to the optical waveguide grating being an optical fiber grating, the second embodiment of the present invention can be applied in a similar manner by using a planar optical waveguide as the optical waveguide.

Next, Examples 4 and 5 in accordance with the third embodiment and Comparative Examples 3 and 4 will be explained.

EXAMPLE 4

A palnar optical waveguide grating having the structure shown in FIGS. 9 and 10 was prepared. Silica glass ($SiO_2$) (refractive index 1.447) was used for the substrate 1, $SiO_2$ (refractive index 1.447) was used for the cladding layer 2, and $GeO_2$-doped $SiO_2$ (refractive index 1.4516) was used for the core 3.

The thickness $T_1$ of the substrate 1 was 1 mm, the thickness $T_3$ of the lower cladding layer 2a was 10 μm, and the thickness $T_4$ of the upper cladding layer 2b was 110 μm. Additionally, the thickness $T_2$ of the core 3 was 8 μm and the width $W_1$ of the trunk portion was 6 μm.

Additionally, the width $W_2$ of the branch portion of the core 3 was 9 μm, the pitch of the periodic changes in the width of the core 3 was 400 μm, and the grating length was 10 mm.

Figure 14:
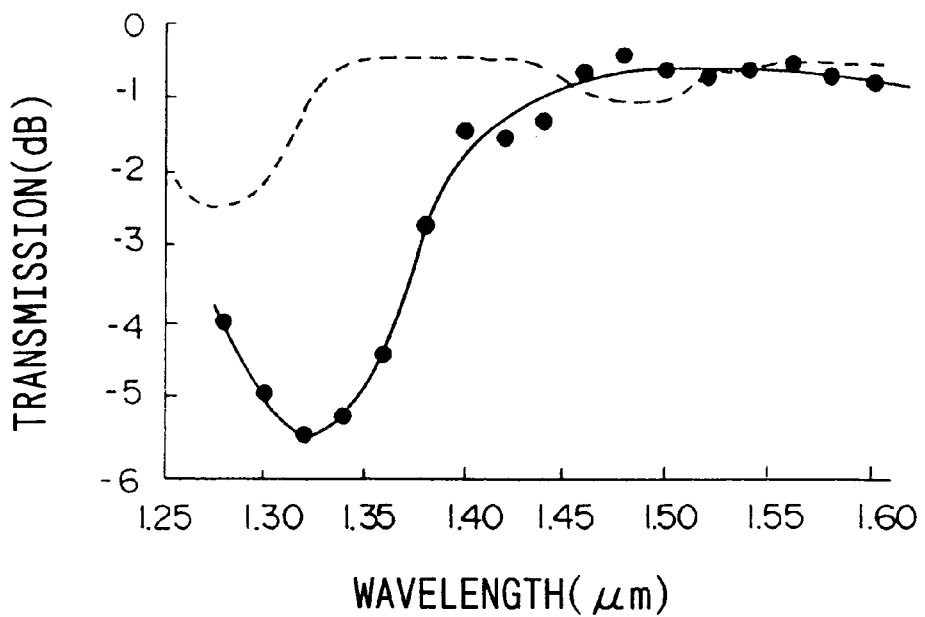
FIG. 14 is a graph showing the properties of an optical waveguide grating obtained by an example according to the third embodiment of the present invention.

This palnar optical waveguide grating was analyzed for the optical intensity of transmission while changing the wavelength. The results are indicated by the solid curve in FIG. 14. In the graph of FIG. 14, the horizontal axis represents the wavelength and the vertical axis represents the transmission. The resulting planar optical waveguide grating exhibited radiative mode-coupled grating properties, wherein the central wavelength was 1.32 μm, the rejection was 5.5 dB, and the rejection bandwidth was 0.3 μm.

COMPARATIVE EXAMPLE 3

A planar optical waveguide grating was made in a manner identical to that of Example 4, with the exception that silicon (Si) (refractive index 3.5) was used as the substrate 1, the thickness $T_3$ of the lower cladding layer 2a was 30 μm, and the thickness $T_4$ of the upper cladding layer 2b was 30 μm.

This planar optical waveguide grating was analyzed for the optical intensity of transmission while changing the wavelength. The results are indicated by the dashed curve in FIG. 14. The resulting planar optical waveguide grating exhibited radiative mode-coupled grating properties, wherein the central wavelength was 1.27 μm, the rejection was 2.5 dB, and the rejection bandwidth was 0.3 μm.

EXAMPLE 5

A planar optical waveguide grating having the structure shown in FIG. 12 was prepared.

Silicon (Si) was used for the substrate 21, $GeO_2$-doped $SiO_2$ (refractive index 1.5) was used for the cladding mode absorption layers 24 and 25, $P_2O_3$-doped $SiO_2$ (refractive index 1.44726) was used for the cladding layer 22, and $GeO_2$-doped $SiO_2$ (refractive index 1.4516) was used for the core 23.

The thickness of the substrate 21 was 1 mm, the thickness of the cladding mode absorption layers 24 and 25 was 4 μm, and the thickness of the cladding layer 22 was 25 μm. The thickness of the core 23 was 8 μm and the width of the trunk portion was 6 μm.

Additionally, the width of the branch portions of the core 3 was 9 μm, the pitch of the periodic changes in the width of the core 3 is 400 μm, and the grating length was 10 mm.

Figure 15:
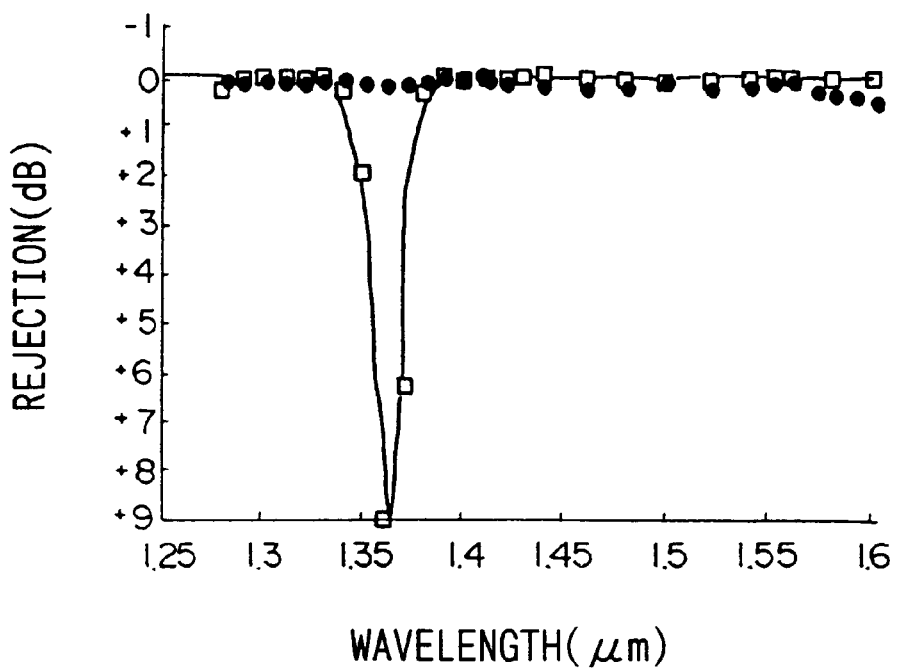
FIG. 15 is a graph showing the properties of an optical waveguide grating obtained by an example according to a third embodiment of the present invention.

This planar optical waveguide grating was analyzed for the optical intensity of transmission while changing the wavelength. The results are indicated by the open squares in FIG. 15. In the graph of FIG. 15, the horizontal axis represents the wavelength and the vertical axis represents the rejection. The resulting planar optical waveguide grating exhibited radiative mode-coupled grating properties, wherein the central wavelength was 1.36 μm, the rejection was 9 dB, and the rejection bandwidth was 0.05 μm.

COMPARATIVE EXAMPLE 4

A planar optical waveguide grating was made in a manner identical to that of Example 5, with the exception that the cladding mode absorption layers 24 and 25 were not formed.

This planar optical waveguide grating was analyzed for the optical intensity of transmission while changing the wavelength. The results are indicated by the closed circles "·" in FIG. 15. This optical waveguide did not exhibit radiative mode-coupled grating properties.

The results of Example 4 and Comparative Example 3 demonstrate that the rejection can be increased by making the refractive index of the substrate 1 equal to the refractive index of the cladding layer 2.

The results of Example 5 and Comparative Example 4 demonstrate that it is possible to obtain radiative mode-coupled grating properties selectively attenuating specific wavelengths of light and to achieve relatively high rejections by means of providing cladding mode absorption layers 24 and 25.

We claim:

1. An optical waveguide grating using an optical waveguide composed of silica glass material, comprising a core which is doped with germanium and boron, such that a variation in a refractive index of said core and a variation in a refractive index of a cladding which accompany a variation in temperature are equal.

2. An optical waveguide grating in accordance with claim 1, wherein the germanium is added in the form of $GeO_2$, the boron is added in the form of $B_2O_3$, and the concentration of $B_2O_3$ in said core is less than or equal to 2.0 times the concentration of $GeO_2$ in said core.

3. An optical waveguide grating in accordance with claim 1, wherein the optical waveguide is an optical fiber.

4. An optical waveguide grating comprising a radiative mode-coupled grating formed in an optical waveguide, wherein said optical waveguide is a 1.3 $\mu$m zero-dispersion optical fiber, a core of which has a mean relative refractive index difference greater than 0.35%, or a cutoff wavelength shifted optical fiber, a core of which has a mean refractive relative index difference greater than 0.45%, or a dispersion shifted optical fiber, a core of which has a mean relative refractive index difference greater than 0.4%.

5. An optical waveguide grating in accordance with claim 4, wherein said optical waveguide has single-mode transmission characteristics in the operative wavelength range of the grating.

6. An optical waveguide grating in accordance with claim 4, wherein said optical waveguide is an optical fiber which is affixed to a silica substrate.

7. An optical waveguide grating in accordance with claim 4, wherein said optical waveguide is an optical fiber which is affixed to a silica substrate, wherein said optical fiber has a grating length of 20 mm or less, and said silica substrate has a length measured parallel to the longitudinal direction of the optical fiber of 40 mm or less.

8. A planar optical waveguide grating formed by making periodic changes in the waveguide structure along the longitudinal direction of an optical waveguide, comprising a core; a cladding surrounding said core, with a lower refractive index than said core; and a cladding mode absorption layer on the outside of said cladding in the thickness direction, with a higher refractive index than said cladding; wherein a mean relative refractive index difference between said cladding mode absorption layer and said cladding is 1 to 5%.

* * * * *